United States Patent [19]

Daykin et al.

[11] 3,842,300

[45] Oct. 15, 1974

[54] LAMINATED ROTOR STRUCTURE FOR A DYNAMOELECTRIC MACHINE

[75] Inventors: Theodore W. Daykin, Dearborn; Anthony S. Ryff, St. Clair Shores, both of Mich.

[73] Assignee: Ford Motor Company, Dearborn, Mich.

[22] Filed: Apr. 30, 1973

[21] Appl. No.: 356,000

[52] U.S. Cl. .................. 310/216, 310/261, 310/154
[51] Int. Cl. .............................................. H02k 1/00
[58] Field of Search .......................... 310/216–218, 310/261, 263, 264, 265, 155, 154

[56] References Cited
UNITED STATES PATENTS

| | | | |
|---|---|---|---|
| 829,015 | 8/1906 | Johnson | 310/263 |
| 2,243,318 | 5/1941 | Rawlings | 310/216 X |
| 3,417,272 | 12/1968 | Hoy | 310/261 |

Primary Examiner—Mark O. Budd
Attorney, Agent, or Firm—Robert A. Benziger; Keith L. Zerschling

[57] ABSTRACT

A dynamoelectric machine laminated rotor structure having improved performance/magnetic characteristics, cost features is disclosed. The laminated rotor structure comprises a plurality of segmented rotor discs each of which has a generally annular core from which a plurality of segments or fingers extend radially. Each segment or finger is terminated in a circumferentially extending flux gathering portion which is arranged at an angle with respect to the radially directed finger portion. The rotor or armature structure fabricated from the plurality of rotor disc having the generally axially extending flux gathering portion therefore presents a relatively large flux gathering area distributed over a relatively long axial length in comparison with the axial length of the core of the laminated structure.

18 Claims, 10 Drawing Figures

PATENTED OCT 15 1974 3,842,300

PATENTED OCT 15 1974

LAMINATED ROTOR STRUCTURE FOR A DYNAMOELECTRIC MACHINE

CROSS REFERENCE TO RELATED APPLICATION

This application is related to copending commonly assigned patent application Ser. No. 355,999 titled "Method of Manufacture of a Dynamoelectric Machine Laminated Armature Structure," filed in the name of Anthony S. Ryff on the same day as this application.

BACKGROUND OF THE INVENTION

1. Field of the Invention

The present invention is related to the field of dynamoelectric machines and more particularly to that portion of the above noted field which is concerned with the rotor or armature structure of such machines.

2. Description of the Prior Art

In the design of dynamoelectric machines in general, the prior art teaches that a laminated rotor structure presents many advantages among which is the reduction of eddy current losses. Thus, a typical rotor structure according to the teachings of the prior art is comprised of a plurality of individual rotor disc members each of which has a generally annular solid core section from which extend a plurality of equiangularly spaced and accurately dimension finger members terminating in a circumferentially extending arcuate flux gathering segment. According to the teachings of the prior art, a limit condition in the design of a dynamoelectric machine using such a rotor structure has been the saturation flux density within this flux gathering segment under motor stall conditions. However, in the application of permanent magnet technology to dynamoelectric machines, a further problem has arisen in that the flux levels thus created by the rotor must be sufficiently low to prevent demagnetizing of the selected permanent magnet. Conversely, for a given dynamoelectric machine design, the permanent magnets heretofore selected have generally been of a high coercive force characteristic in order to overcome any demagnetizing effect which might be produced by the armature flux density. It is, therefore, one object of the present invention to provide a rotor structure which will produce significantly lower demagnetizing flux density for a given motor performance thereby enabling the use of lower coercive force, and hence less expensive, permanent magnets.

A further problem which is presented by the rotor structure according to the teachings of the prior art resides in the quantity of rotor material and the quantity of electrical conductor which these rotor structures necessitate in order to reach a given performance level. These problems arise in two ways. Firstly, the cost of the core material and the conducting material, typically copper, is greatly increasing. Secondly, the greater the mass of material which is to be rotated with the armature shaft, the more difficult it becomes to provide a balanced structure and the more expensive the bearings upon which such structure is to rotate. It is, therefore, an object of the present invention to provide a rotor structure which requires significantly less rotor disc material and/or less electrical conductor material for the same level of performance. In line with the last mentioned objective of the present invention, it is also an object of the present invention to provide a laminated rotor structure having the capability of reducing the electrical losses associated with the armature winding of such a rotor structure.

SUMMARY OF THE PRESENT INVENTION

The present invention provides a rotor structure for an armature of a dynamoelectric machine having a plurality of stacked nested ferromagnetic laminations or rotor discs. Each rotor disc or lamina is comprised of a generally annular core member from which extend a plurality of equiangularly spaced radially extending finger members each of which has an arcuate flux gathering segment at its circumferential end. In a departure from the teachings of the prior art, the flux gathering segment is arranged at an angle with respect to the radially extending finger portion so as to increase its flux gathering area. In forming the lamina so described into a flux producing rotor element, a plurality of lamina or discs are arranged in nesting relationship so that the radially extending finger portions are in axial alignment and the arcuate flux gathering segments are abutting. The flux producing rotor element may be comprised of first and second sections having the angularly arranged flux gathering segments oppositely directed and placed in back to back abutting relation.

In the nested configuration, the axial length of the flux gathering area is larger than the axial length of the core portion of the armature thereby providing an effective flux gathering area comparable to rotor members having an increased mass of rotor material and an increased quantity of conductor material associated with their greater overall axial core length. The armature according to the present invention is operated with the core and radially extending finger portion at or near a saturated level of electro-magnetic flux but the greatly increased flux gathering area permits this portion of the rotor to be at a non-saturated level commensurate with efficient operation. By operating the core of the rotor structure at or near a saturated level of electromagnetic flux, the armature has a "built in" limit feature which automatically prevents a flux increase under stall conditions which would normally demagnetize portions of any permanent magnet energization.

The present invention, therefore, provides for electrically and magnetically more efficient rotor structures which may be used in conjunction with the more economical low coercive force permanent magnets. Alternatively, increased dynamoelectric machine performance may be obtained without increasing the cost or the size of the dynamoelectric machine whether it be of the permanent magnet stator variety or of the wound inductive stator variety.

DETAILED DESCRIPTION OF THE DRAWINGS

Figure 1:
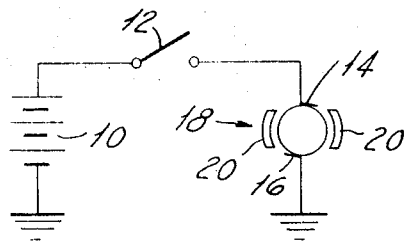
FIGS. 1 and 2 illustrate two electrical circuits for dynamoelectric machines with which the present invention is of utility.

Referring now to the drawings, wherein like numbers designate corresponding structure in the various figures, a permanent magnet dynamoelectric machine electric schematic is illustrated in FIG. 1. With particular reference to FIG. 1, a battery 10 is connected in series relationship with switch 12 and the brushes 14, 16 of a dynamoelectric machine indicated generally as 18. Dynamoelectric machine 18 has a stator field generated by permanent magnets 20.

Figure 2:
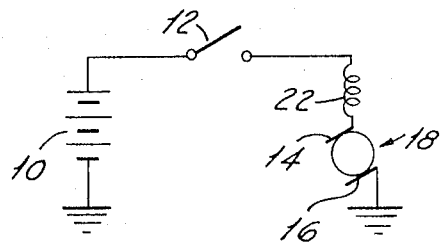

Referring now to FIG. 2, an alternate electrical connection for a dynamoelectric machine is illustrated wherein the battery 10 and the switch 12 are in series relationship with the brushes 14, 16 of a dynamoelectric machine 18. In the FIG. 2 circuit, the stator field is generated by electromagnetic means in the form of electromagnetic coil 22 which is placed in series relationship between switch 12 and brush 14. The embodiments of FIGS. 1 and 2 illustrate but two of the many known electrical connection arrangements for dynamoelectric machines and are intended to be merely illustrative.

Figure 4:
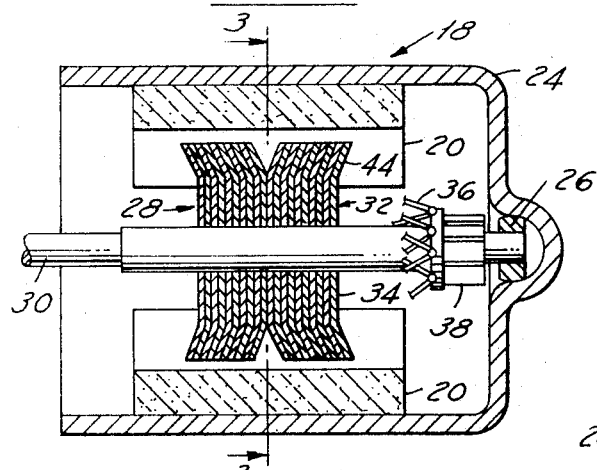
FIG. 4 illustrates the dynamoelectric machine of FIG. 3 in an axial sectional view taken along line 4—4 of FIG. 3.
Figure 3:
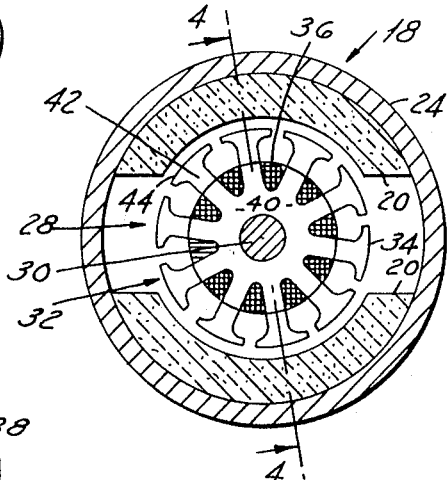
FIG. 3 is a radial sectional view of the dynamoelectric machine of FIG. 4 taken along the line 3—3 of FIG. 4.
Figure 5:
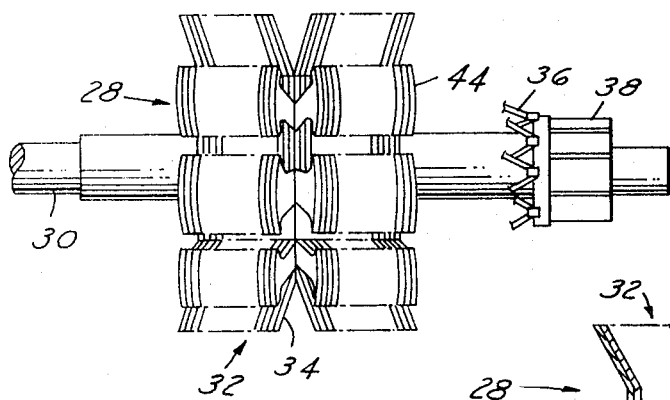
FIG. 5 through 10 illustrate various configurations for an armature of a dynamoelectric machine according to the present invention with FIG. 5 being an enlarged elevational view of the armature of FIGS. 3 and 4 and with FIGS. 6 through 10 inclusive being sectional views.

With reference now to FIGS. 3, 4 and 5, the dynamoelectric machine 18 is illustrated in a pair of sectional views. Dynamoelectric machine 18 has a stator structure comprising generally a housing 24, stator field generating means in the form of permanent magnets 20 and an armature shaft receiving bearing means 26. A rotary structure generally designated 28 is received within housing 24 and includes a rotor or armature shaft 30 received and supported for rotation within the bearing means 26. A rotary electromagnetic field generating means 32 is fixedly attached to the armature shaft 30 for rotation therewith. The rotary electromagnetic field generating means 32 is comprised of first and second oppositely directed portions, each having a plurality of stacked nested lamina or discs 34 which are fixedly attached to the shaft 30 and a plurality of electrical conductors or windings 36 (which have been partially removed from FIG. 4 for purposes of clarity). With reference to FIGS. 1, 3 and 4, a DC electric current is applied through brushes 14, 16 to a commutating brush/slip ring structure 38 for energizing selected ones of the conductors 36 to generate within the field generating means 32 an electromagnetic flux field which may react against the flux field of the stator means to produce rotary motion of the armature shaft 30. This phenomenon and general construction is well known and further discussion thereof is not deemed to be necessary.

With particular reference to FIGS. 3 and 4, it can be seen that each of the individual lamina or discs 34 has a central annular core section 40, a plurality of radially extending sections or fingers 42 angularly equidistantly spaced around core 40 and circumferentially directed arcuate flux gathering segments 44. With particular reference to FIG. 4, it can be seen that the circumferentially directed flux gathering segments 44 are arranged at an angle with respect to the radially directed fingers 42. The rotary field generating means 32 is as hereinabove stated, comprised of first and second portions each of which is comprised of a plurality of substantially identical lamina 34 with the lamina 34 of the first portion arranged to direct their circumferentially extending segments 44 rightward (relative to FIG. 4) and the lamina 34 of the second portion of rotary field generating means 32 arranged to direct their flux gathering segments 44 leftward (relative to FIG. 4). This presents an axially relatively long flux gathering surface in the vicinity of the stator field generating means while providing an axially relative short core length at the rotary shaft 30. This permits a substantially shortened electrical path between the brushes 14, 16 consequently reducing the quantity of conductor and the electrical losses associated with the conductor. This also reduces the amount of core material required to provide a core structure having the same flux gathering area as that illustrated by the FIG. 4 embodiment.

The present invention also provides an electromagnetically more efficient rotary field generating means. Accepting the total electromagnetic flux generated by the rotary field generating means as an indirect, proportionate measure of the power of the dynamoelectric machine for a given stator field, the rotary field generating means of the present invention is capable of generating a comparable magnitude electromagnetic field having a reduced flux density in the air gap between the rotor and the stator due to the increase in flux gathering area. The reduced flux density permits, for example, low coercive force permanent magnets. In generating the same level of total flux with a core having a reduced axial length, the flux density within the rotary field generating means 32 will be increased to a value which may approach, for example, saturation of the core material thereby permitting electromagnetically more efficient use of the rotary field generating means 32 while providing automatic limiting of the flux density so that dynamoelectric machine stall conditions will not result in partial demagnetization of a permanent magnet stator.

Figure 6:
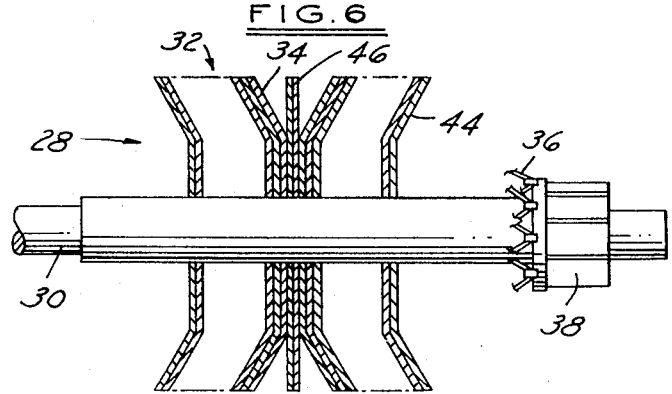

Referring now to FIG. 6, an alternative embodiment of a rotary field generating means according to the present invention is shown wherein the first and second pluralities of lamina (the first and second portions of the rotary field generating means 32) are separated by lamina 46 having the flux gathering segments thereof arranged to be radially outwardly from the core thereof substantially as taught by the prior art. This arrangement permits flux gathering action to occur at the axial center of the rotor structure 28 without incurring substantial fringing or air gap losses.

Figure 7:
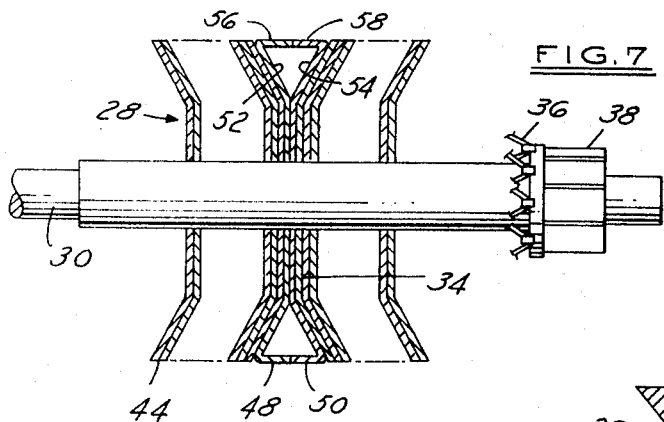

Referring now to FIG. 7, a further alternative embodiment is shown wherein the first and second portions of the rotary field generating means are separated by a pair of lamina 48, 50 which have first angularly arranged segments 52, 54 arranged to be in nesting relationship with the angularly arranged segments 44 of the associated first and second portions and a further, axially directed, flux gathering flange portion 56, 58 which provides for a substantially solid flux gathering surface arranged intermediate the oppositely directed angularly arranged segments 44 of the first and second portions of the rotary core 28 of the rotary field generating means 32.

Figure 8:
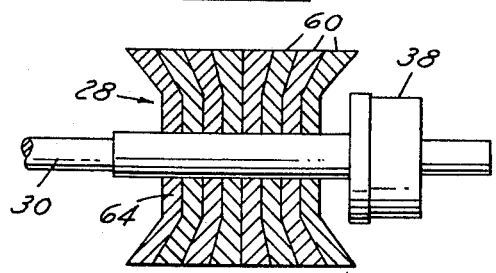

Referring now to FIG. 8, a further alternative for the flux producing core portion of rotary structure 28 is illustrated. The core portion is comprised of a plurality of lamina 60 each of which is individually contoured to provide for the desired nesting relationship. Each lamina 60 is provided with a radially remote flux gathering portion 62 of varying thickness and angularity with respect to the radially directed central portions 64. The central portions 64 are substantially uniformly dimensioned.

Figure 9:
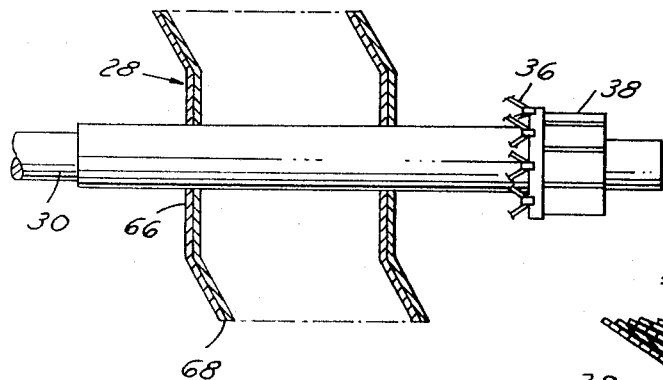

Referring now to FIG. 9, a further alternative embodiment is shown wherein each individual lamina 66 is provided with alternating axially oppositely circumferentially extending flux generating portions 68, 70 and the flux producing portion of rotary structure 28 is provided with a plurality of nested lamina.

Figure 10:
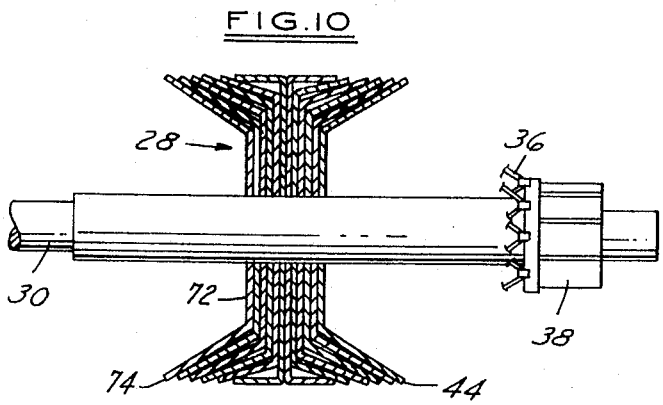

Referring now to FIG. 10, a further alternative embodiment for the flux producing portion of rotary structure 28 is illustrated. In this embodiment, the flux producing portion is comprised of first and second flux producing portions. The first flux producing portion is provided with a plurality of lamina 72 each of which has a circumferentially extending axially directed portion 74 which is directed leftward relative to the drawing in FIG. 10 and a second flux producing portion wherein the circumferentially extending axially directed portion 74 is directed rightward relative to the drawing in FIG. 10. In the FIG. 10 embodiment, the angle of intersection between each flux gathering portion 44 and its radially extending finger portion is a function of the closeness of the individual lamina 72 to the center of the flux producing portion 28 with the central lamina having a substantially 90° angle between the flux gathering portion and the radially finger portion and with the axially more remote lamina having gradually reduced angles. This embodiment thus represents the maximum axial length at the flux gathering portion with the minimum axial length at the rotary shaft 30.

We claim:

1. A dynamoelectric machine comprising a housing, an armature rotatably received within said housing, means for producing a magnetic field positioned about said armature and coupled to said housing, said armature comprising a stack of closely axially spaced laminated members, each member comprising a substantially circular core section and having a plurality of generally outwardly directed finger elements, the members of the stack being arranged so that the finger elements of adjacent members are axially aligned as a winding receiving portion, each finger element including a flux collecting portion at its radially remote free end whereby the flux collecting portions are positioned adjacent said magnetic field producing means, said armature further comprising means defining armature windings spaced in proximity to the core sections of the lamination members, said armature windings comprising at least one electrical conductor extending in a first axial direction between the first pairs of radially adjacent aligned finger elements and in an opposite axial direction between second pairs of radially adjacent finger elements, the axial length of the stack of laminations at the flux collecting portion is substantially greater than the axial length of the stack of laminations at the winding receiving portion.

2. The combination of claim 1 in which each of said lamination members has a substantially planar central portion, and an annular peripheral portion positioned at an angle less than about 180° with respect to said planar central portion, said substantially planar central portions being positioned in engagement with one another, and said angulation occurring intermediate the ends of said finger elements.

3. The combination of claim 2 in which two centrally positioned laminations are positioned with their substantially planar central portions positioned in engagement, and the peripheral portions extending in opposite angular directions, the remainder of said laminations nesting within adjacent laminations.

4. The combination of claim 2 in which two central laminations have their substantially planar central portions positioned in abutting relationship and their annular peripheral portions extending in opposed angular relationship.

5. The combination of claim 4 in which said annular peripheral portions have axially extending portions extending therefrom in opposite axial directions.

6. The combination of claim 5 in which said axially extending portions are positioned in abutting engagement.

7. The combination of claim 1 in which a plurality of laminations positioned in the center of said stacks are substantially planar, and the remainder comprise one group having their peripheral portions extending in one direction and another group having their peripheral portions extending in the other direction.

8. The combination of claim 1 in which the two central laminations have substantially planar surfaces positioned in abutting relationship and the other surface of each has a peripheral portion extending at an angle to said planar surface, the remainder of said laminations including a central planar portion and angularly extending peripheral portion positioned in nesting engagement with said central laminations.

9. The combination of claim 1 in which each lamination has a central annular portion and a plurality of radially extending teeth extending from said central annular portion, said central annular portion and a portion of each tooth joining said central annular portion defining a plane, the radial outward portion of each tooth extending at an angle with respect to said plane.

10. A dynamoelectric machine comprising an armature, a field, means rotatably coupling said armature and field, said armature including a plurality of laminations constructed of ferromagnetic material, said plurality of laminations including a flux collecting portion extending beyond said winding supporting portion in a direction parallel to the axis of rotation of said armature, said laminations, at said winding supporting portion, contactively engaging one another, and an armature winding positioned about said winding supporting portion.

11. A dynamoelectric machine comprising a housing, an armature mounted in said housing, means positioned about said armature for producing a magnetic field, the armature comprising a body portion constructed of material having ferromagnetic characteristics, said body portion having a flux collecting portion positioned adjacent said magnet field producing means and a winding receiving portion positioned radially inwardly of said flux collecting portion, the flux collecting portion extending in an axial direction beyond said winding receiving portion at each axial end of said winding receiving portion.

12. A dynamoelectric machine comprising a stator, a generally cylindrically shaped rotor rotatably mounted in said stator for rotation about its axis, said rotor comprising a body portion constructed of a material having ferromagnetic characteristics, said body portion having a flux collecting portion and a winding receiving portion, at least two permanent magnets positioned in said stator in spaced radial relationship to said flux collecting portion, said flux collecting portion of said body portion being positioned radially outwardly of said winding receiving portion and in proximity to said permanent magnets, said flux collecting portion extending axially beyond said winding receiving portion, a winding received by said winding receiving portion in a position such that the effective length of said winding that interacts with the magnetic field of said magnets is positioned in an axial direction in said dynamoelectric machine.

13. A dynamoelectric machine comprising a stator member and a rotor member, means coupled to said stator member and said rotor member for rotatably mounting one of said members with respect to the other of said members, means positioned in one of said members for providing a magnetic field, the other of said members including a body portion constructed of material having ferromagnetic characteristics, said body portion having a magnetic flux collecting portion positioned adjacent said magnetic field and a winding receiving portion spaced from said flux receiving portion, the axial length of said flux collecting portion being substantially greater than the axial length of said winding receiving portion.

14. The combination of claim 13 in which said rotor member is of substantially cylindrical configuration and is mounted for rotation with respect to said stator member about the cylindrical axis, and further comprising a winding positioned upon said winding receiving portion in a position such that the effective length of said winding that interacts with the magnetic field is positioned in a direction parallel to said cylindrical axis.

15. The combination of claim 14 in which the axial length of said winding receiving portion is approximately one half the axial length of said magnetic flux collecting portion at a position on said flux collecting portion most nearly adjacent said means for producing said magnetic field.

16. The combination of claim 13 in which said stator member is positioned around said rotor member in radially spaced relationship and said means for providing a magnetic field is positioned in one of said members to produce a radially extending magnetic field through the space between said members and through said other member.

17. The combination of claim 16 in which the axial length of said winding receiving portion of said body portion is substantially one half the axial length of said flux collecting portion at a position in said flux collecting portion most nearly adjacent said means for producing said magnetic field.

18. In a dynamoelectric machine of the type having an electromagnetic flux gap and at least one electromagnetic flux member having an electromagnetic flux surface comprising at least a portion of the boundary of the gap, the electromagnetic flux member having an electrical winding arranged for electrical current flow in alternating directions, an improved electromagnetic flux member comprising:

a winding receiving portion dimensioned and sized to be at electromagnetic saturation under conditions of maximum current flow through the winding;
 a flux surface sized to have a flux density compatible with the maximum flux density which may be maintained in the flux gap, the flux density at the flux surface being less than the flux density in the winding receiving portion by the ratio of surface area to cross-sectional flux area in the winding receiving portion; and
 a transition portion arranged between the winding receiving portion and the flux surface whereby the flux density may smoothly vary from the saturation flux density to the surface flux density.

* * * * *